United States Patent [19]

Loveless et al.

[11] Patent Number: 4,532,061

[45] Date of Patent: Jul. 30, 1985

[54] GRAFTED POLYALPHAOLEFIN POLYMERS, METHOD FOR ITS PRODUCTION AND OILS CONTAINING IT

[75] Inventors: Frederick C. Loveless, Cheshire; David J. Smudin, Waterbury, both of Conn.

[73] Assignee: Uniroyal, Inc., Midlebury, Conn.

[21] Appl. No.: 530,335

[22] Filed: Sep. 8, 1983

[51] Int. Cl.$^3$ ............................................. C10M 1/30
[52] U.S. Cl. ................................. 252/58; 525/288; 525/292
[58] Field of Search .................. 252/58; 525/288, 292

[56] References Cited

U.S. PATENT DOCUMENTS

| | | | |
|---|---|---|---|
| 3,081,294 | 3/1963 | Beynon et al. | 252/58 X |
| 3,322,672 | 5/1967 | Stanton et al. | 252/58 |
| 3,929,800 | 12/1975 | Horowitz | 252/58 X |
| 3,933,942 | 1/1976 | Kennedy et al. | 525/288 X |
| 4,041,098 | 8/1977 | Loveless | 585/521 |

*Primary Examiner*—W. J. Shine
*Attorney, Agent, or Firm*—John A. Shedden

[57] ABSTRACT

A method of making grafted polyalphaolefin polymer comprising providing (a) an aluminum compound having the formula $R_3Al_2X_3$ or $R_nAlX_{3-n}$, wherein R is $C_1$–$C_{18}$ alkyl, $C_7$–$C_9$ aralkyl, $C_7$–$C_9$ alkaryl or $C_6$–$C_{10}$ aryl; X is Cl, Br or I, an n is an integer from 1 to 3; (b) a polyhalogenated compound having the formula $(-CH_2CR^1R^2)_mY_p$, wherein $R^1$ is hydrogen or $C_1$–$C_3$ alkyl; $R^2$ is linear or branched $C_2$–$C_{30}$ alkyl; Y is Cl, Br or I; m is an integer from 3 to 3000; and p is an integer of at least 3; and (c) a cationically polymerizable monomer having the formula $CH_2=CR^1R^2$, wherein $R^1$ and $R^2$ have the meanings above; and (B) bringing into contact above (a), (b) and (c) under polymerization conditions.

5 Claims, No Drawings

GRAFTED POLYALPHAOLEFIN POLYMERS, METHOD FOR ITS PRODUCTION AND OILS CONTAINING IT

This invention relates to novel compositions useful as lubricating oils, hydraulic fluids and the like and to their method of preparation.

It is known that alpha olefins may be polymerized to high or low viscosity functional fluids. The choice of catalyst and temperature are the primary means by which product viscosity is regulated.

It is known that high viscosity polyalphaolefins can be prepared using catalyst systems based on aluminum halides, combinations of alkyl aluminum chloride and alkyl halides and Ziegler catalysts.

Both high and low viscosity alpha olefin oligomers are known to be useful in the production of functional fluids such as lubricants. Low viscosity oligomers, (for example those having a kinematic viscosity from 2 to 10 $(m^2/s) \times 10^{-6}$ at 100° C.) are frequently used as the main base stock for synthetic lubricants having excellent low temperature fluidity. They are frequently thickened with high molecular weight rubbery polymers or viscous oils. More viscous polyalphaolefins (e.g. K.V.=40-100 $(m^2/s) \times 10^{-6}$ at 100° C.) are generally added to low viscosity natural or synthetic fluids as thickeners and/or viscosity index (V.I.) improvers.

References of interest are:

U.S. Pat. No. 4,045,508 teaches the preparation of low viscosity alpha olefins from a variety of catalyst combinations based on boron trifluoride and proton donors.

U.S. Pat. Nos. 2,525,788 and 3,637,503 describe the preparation of highly viscous polyalphaolefins as thickeners and V.I. improvers.

U.S. Pat. No. 2,525,788 describes a method based on the use of aluminum bromide activated with HBr as catalyst wherein alpha olefins are polymerized at very low temperatures.

U.S. Pat. No. 3,637,503 describes as catalyst aluminum chloride "activated" with hydrogen chloride. The reaction cycles disclosed in these two patents illustrate that the production of high viscosity polyalphaolefins requires not only low temperatures, but also long reaction times. This fact is further disclosed in the publication: "Some Effects of Monomer Chain Length on the Properties of Normal Alpha Olefin Polymers using an Aluminum Cloride Catalyst" by J. P. Giannetti and A. M. Henke, Abstracts of Papers Presented at New York, N.Y. Sept. 9-13, 1963, page 18. This publication relates that even at a constant polymerization temperature, the rate at which monomer is added to catalyst has a strong influence on the viscosity of the oligomer produced.

U.S. Pat. No. 4,041,098 describes a soluble catalyst system for the polymerization of alpha olefins. Production of material below $C_{60}$ is stressed. It will be shown that, while moderately high viscosity fluids can be prepared from the teachings of this patent, the improvements taught in the current invention are unique in producing compositions having high viscosity.

The preparation of graft polymers is illustrated in the following references:

Graft Modification of Poly(vinylchloride) and Related Reactors, Journal of Polymer Science: Part A-1, Vol. 10, 2507-2525 (1972). In this reference butadiene or isobutylene are grafted onto polyvinylchloride. The grafting of only a few percent monomer onto the PVC substrate improves thermal stability.

Block and Graft Copolymers by Selective Cationic Initiation. Synthesis and Characterization of Styrene-Isobutylene Block Copolymers by Use of Chlorobrominated Alkanes, Journal of Polymer Science: Polymer Chemistry Edition, Vol. 13, 29-37 (1975) discloses cationic grafting of styrene and isobutylene onto a dihalo compound to form high molecular weight block polymers.

Improved Thermoplastic Elastomers Through Cationic Polymerization, J. Polymer Sci.: Symposium No. 56, 13-32 (1976). This reference reports the grafting of aromatic monomers onto chlorinated butyl rubber or chlorinated ethylene propylene rubber to produce polymers having glassy and rubbery segments and displaying thermoplastic properties. In the described polymers the polyhalo rubber substrates formed over 50% of the final product mass.

Other references of interest are:

P. H. Plesh, Chem. Ind. (London) 1958, 954.

J. P. Kennedy et al., Polym. Prep. 14(2), 974 (1973).

J. P. Kennedy et al., Polym. Prep., 15(1), 393 (1975.

U.S. Pat. No. 3,565,878.

French Pat. No. 1564485 and British Pat. No. 1174323.

None of the above references describe or suggest graft polymerization wherein:

(a) the substrate may be a halogenated polymer of the same monomer which is to be grafted onto said substrate;

(b) the halogenated substrate contains at least three halogen atoms (as further described below) and is utilized in very low levels as compared to the monomer to be polymerized;

(c) viscous oils useful as lubricant additives are readily produced;

(d) alpha-olefins such as decene-1 are utilized as the monomer; and (e) solvent is not necessary.

It has been unexpectedly found that high viscosity oligomers may be made at polymerization temperatures and rates not taught in the prior art. The advantages gained by the teachings of the instant invention lie primarily in the much lower heat exchange capacity required (to maintain prior art low temperatures) and in the amount of material which can be produced in a given reactor over a given duration.

In the practice of this invention, synthetic hydrocarbon fluids are prepared by contacting at moderate temperatures one or more cationically polymerizable olefins, such as alpha olefins, with a catalyst combination comprising an organo aluminum compound and an organic hydrocarbyl compound containing a minimum of three halogen atoms per molecule and bring into contact above reactants under polymerization conditions. Using the catalyst and cocatalyst, according to this invention, highly viscous oligomeric oils can be produced without the necessity of employing low polymerization temperatures and prolonged reaction cycles. Oligomeric oils can be conveniently prepared by combining, in a suitable reaction vessel, solutions of an organo aluminum compound (such as diethyl aluminum chloride in a monomer such as decene-1) with a solution of a polyhalogenated hydrocarbon (such as a polychlorinated polyalphaolefin) in the same or a different monomer. Moderate temperatures (0°-60° C.) are maintained in the reaction zone by controlling the rate of mixing of the feed streams and/or heat exchangers. Reaction to form the product is very rapid, and polymerization can be achieved in a batch-type or continuous fashion. Monomer conversion is normally greater than 95% and usually greater than 99%. The crude reaction product is then optionally "shortstopped" with water or a low molecular weight alcohol, followed by a catalyst removal step such as an aqueous wash. Other methods of catalyst removal such as filtration, absorption or centrifugation can also be utilized. The catalyst-free product may be subjected to an evaporative distillation to remove low boiling oligomers (e.g. below $C_{25}$) and hence insure low volatility in the final product. The oil is, optionally, hydrogenated (before or after distillation) by conventional methods to give fluids having outstanding oxidative stability. Normally an iodine number below 5 and preferably below 2 will produce an oligomer with excellent oxidation stability as illustrated in U.S. Pat. No. 4,110,234.

The aluminum compounds suitable for this invention have the formula $R_3Al_2X_3$ or $R_nAlX_{3-n}$, wherein R is $C_1$–$C_{18}$ alkyl, $C_7$–$C_9$ aralkyl, $C_7$–$C_9$ alkaryl or $C_6$–$C_{10}$ aryl; X is Cl, Br or I, and n is an integer from 1 to 3. Typical R radicals are methyl, ethyl, propyl, butyl, hexyl, octyl, decyl, dodecyl, octadecyl, benzyl, cumyl, tolyl, xylyl, phenyl, naphthyl and the like. Preferably, R is $C_2$–$C_{12}$ alkyl, benzyl and tolyl, and X is Cl or Br.

The organohalides operable in this invention are polyhalogenated organic hydrocarbons having the formula $(-CH_2CR^1R^2-)_mY_p$, wherein $R^1$ is hydrogen or $C_1$–$C_3$ alkyl, preferably hydrogen or methyl, most preferably hydrogen; $R^2$ is linear or branched $C_1$–$C_{30}$ alkyl, preferably $C_1$–$C_{18}$ alkyl and most preferably $C_4$–$C_{10}$ alkyl; Y is Cl, Br or I, preferably Cl or Br, most preferably Cl; m is an integer of from 3–3000, preferably 5–500 and most preferably 8–200; p is an integer of at least 3, usually 3–6000, preferably 3–1500 and most preferably 3–400, it being understood that p does not exceed the number of replaceable hydrogen atoms within the $(-CH_2CR^1R^2-)_m$ moiety. The resultant graft polymer has the formula $A[(-CH_2CR^1R^2-)_q]_r$, A being $(-CH_2CR^1R^2-)_mY_{p-d}$, wherein $R^1$, $R^2$, Y, m and p have the meanings above; q is an integer of 1–100, preferably 3–75 and most preferably 6–50; r is an integer of 3–1500, preferably 3–750, usually 3–200; and d has a value of from r to p.

Copolymers from mixtures of alpha-olefins can also be prepared and such methodology finds benefits particularly in blends of low molecular weight and high molecular weight monomers, whose copolymers have properties superior to mixtures of their homopolymers.

It should be obvious to those skilled in the art that a variety of very useful functional fluids can be prepared utilizing various mixtures of the above monomers.

As with all polymerizations involving organometallic catalysts, all ingredients and equipment used should be free from air, moisture and other potential catalyst poisons. Equipment can be dried by heat and vacuum while monomers can be distilled, passed through desiccant columns or stored over desiccants. Manipulation of the ingredients before and during polymerization should stress anaerobic conditions and inert gas atmospheres where necessary.

In practice, the level or organoaluminum compound utilized should be at least 0.1% by weight of the total monomer. The organohalide usage should be such to provide an ultimate total halogen to aluminum ratio of at least about 2.5/1, preferably 3/1 or higher.

While there is no upper limit on the amount of either catalyst component, there is not really a need for utilizing greater than 5% by weight of the organometallic compounds or by operating at halogen to aluminum ratios greater than 25/1.

The high molecular weight products formed by the practice of this invention are novel compositions which are particularly useful as thickeners and viscosity index improvers in blends with low viscosity fluids. The products of this invention may comprise mixtures of grafted and ungrafted molecules. It is the presence of the grafted molecules dissolved in the ungrafted species which essentially confers viscosity to the products of this invention.

In accordance with the teaching of this invention, the molecular weight (and therefore the viscosity) of the halogenated hydrocarbon base polymer can be rapidly increased in a controllable manner.

While such grafting techniques are known, they invariably relate to the production of high molecular weight graft and block polymers wherein a monomer is grafted to a very high molecular weight rubber or plastic and where the substrate and polymerized monomer are completely different species. Furthermore, the weight ratio of halogenated substrate to monomer is frequently around 1 to 1. In the present invention, relatively low levels of halogenated substrate are utilized so that the final product is, in essence, polymerized monomer consisting of unbranched and highly branched (grafted) species. In cases where polymerized monomer is halogenated and then grafted with more of the monomer, the product is 100% pure. This latter instance is, in fact, a preferred practice of the invention. Such a "pure" graft is advantageous in producing viscous oils. There is essentially no advantage in producing pure grafts of solid rubbers.

As mentioned previously, the process of this invention provides means for increasing the viscosity of a relatively low viscosity polyalphaolefin in a facile manner. Due to their extraordinary shear stability, the graft polymers of this invention are most suitable as viscosity index improvers for other oils, e.g., lubricating oils, such as mineral oils, synthetic oils, such as polyalphaolefins, or compatible ester fluids. It has been found that high molecular weight, linear viscosity index improvers have the tendency to succumb to polymer scission in a high shear environment, such as diesel or gasoline engines or turbines, whereas the instant graft polymers are believed to have a comb-like configuration and appear to be less prone to mechanical breakdown because of their relative compactness.

The graft polymers of this invention may be subjugated to halogenation and subsequent further graft polymerization reaction. In fact, depending on the anticipated requirements of use, such halogenation/grafting procedures may be carried out several times without falling outside the scope and intent of this invention.

EXAMPLE I

This example illustrates the preparation of relatively low viscosity oligomers of decene made according to U.S. Pat. No. 4,041,098. This example is outside the scope of this invention.

A dry, nitrogen filled 4-necked 500 ml. round bottomed flask was fitted with:
(1) A thermometer.
(2) A 125 ml dropping funnel having a pressure equalizing side arm and a stopper.

(3) A similar dropping funnel connected to a nitrogen source and, via a T-tube, to a "bubbler" containing mineral oil for preservation of slight nitrogen pressure in the system.

(4) An overhead mechanical stirrer.

Beneath the flask was placed a cold water bath on a jack to permit periodic cooling when necessary.

Decene-1 and tertiary butyl chloride were added to funnel (2) in the amounts recorded below. Decene-1 and alkyl aluminum compounds were added to funnel (3) as recorded below.

The total charge of decene was 200 ml, portioned so that funnels (2) and (3) contained equal volumes after the other ingredients were added.

The contents of funnels (2) and (3) were added with vigorous stirring at equal rates to the flask so that addition was completed in 90 minutes.

The temperature was maintained at 42±2° C. by administration of the cooling bath as required. After addition was complete, stirring was continued for an additional 15 minutes and then the catalyst was destroyed by the addition of 5-10 ml of methanol. The precipitated catalyst was removed by filtering the reaction slurry through a bed of F-20 [trademark] alumina.

Optionally, a solvent such as hexane may be added to the quenched product prior to filtration.

The clear crude oligomer was then subjected to vacuum distillation to remove low boiling solvents and any species below $C_{25}$. Materials boiling below about 175° C. at a vacuum of 0.1 mm were removed to give the desired product in greater than 90% yield (based on monomer charged) having a flash point over 500° F.

The following table summarizes the polymerizations and gives the viscometric properties of the product oils.

| Run No. | I-A | I-B | I-C |
|---|---|---|---|
| CATALYST | $Et_2AlCl$ | $Et_3Al_2Cl_3$ | $EtAlCl_2$ |
| Millimoles | 24 | 12 | 24 |
| Cocatalyst | tBC | tBC | tBC |
| Millimoles | 75 | 60 | 48 |
| Cl/Al | 4.1 | 4.0 | 4.0 |
| Product | | | |
| Mn | 1096 | 1047 | 1083 |
| $K.V._{100°\ C.}$ $(m^2/s) \times 10^{-6}$ | 26.08 | 23.68 | 24.05 |
| $K.V._{40°\ C.}$ | 234.95 | 204.35 | 204.57 |
| V.I. | 143 | 143 | 146 | tBC = tertiary butyl chloride

These polymerizations show that the reaction of tertiary butyl chloride with the prior art alkylaluminum chlorides of U.S. Pat. No. 4,041,098 produces catalyst species, all of which make essentially identical oligomers having nearly the same kinematic viscosity (K.V.) and (number average) molecular weights. The molecular weight distributions of the polymers were essentially identical.

Oligomers having viscosities below 40 centistokes (at 100° C.), as made in this example, are not particularly useful as thickeners or V.I. improvers.

EXAMPLE II

This example illustrates a typical practice of this invention. In a polymerization conducted substantially in accordance with Example I, except that tertiary butyl chloride was replaced with a polychlorinated polyalphaolefin. The latter was prepared by chlorination, at elevated temperatures, of a polydecene oligomer having a molecular weight of 2000. After chlorination, the chlorine content was 30.2% by weight, and the molecular weight was 2865. The average number of chlorine atoms per molecule was 24.4. Seventeen grams of this polychlorinated polyalpholefin, hereafter referred to as P-2000-30.2 were employed. The product oil had the following properties:

| | |
|---|---|
| $K.V._{100°\ C.} =$ | 100.9 $(m^2/s) \times 10^{-6}$ |
| $K.V._{40°\ C.} =$ | 1170.8 $(m^2/s) \times 10^{-6}$ |
| V.I. = | 177 |
| Mn = | 1932 |

Gel permentation chromatographic analysis of the resultant product indicated the presence of a mixture of two distinct portions, i.e., graft polymer and homopolymer. The graft polymer having a number average molecular weight of about 12800 amounted to 47.3 percent of the total product. The molecular weight of the linear polyalphaolefin portion was essentially the same as that of Example I-A. It was calculated that ca. 40 mole percent of the chlorine atoms originally situated on the substrate produced grafting sites.

The unique high molecular weight graft species produced by this process are responsible for the increased viscosity of the product of Example II over the product formed in Example I-A under substantially identical process conditions.

EXAMPLE III

This example examines the consequences of decreasing the level of P-2000-30.2.

An oligomerization of decene was performed substantially as in Example II, except that only 8.5 g of P-2000-30.2 was utilized. The produced fluid had the following properties:

| | |
|---|---|
| $K.V._{100°\ C.} =$ | 80.32 $(m^2/s) \times 10^{-6}$ |
| $K.V._{40°\ C.} =$ | 906.4 $(m^2/s) \times 10^{-6}$ |
| V.I. = | 169 |
| Mn = | 1744 |

It was calculated that the average number of graft chains per spine molecular was 16.57 and that the Mn of the grafted species was 20,160. The graft molecules accounted for 39.3% of the product. Thus, although each graft molecular was on the average larger than in Example II, the lower percentage of graft caused by the use of less spine resulted in a lower viscosity product.

EXAMPLE IV

This example illustrates the effect of temperature on the graft process of this invention. Example III was essentially repeated except that the temperature was maintained at 22±2° C. The properties of the product oil were:

| | |
|---|---|
| $K.V._{100°\ C.} =$ | 138.65 $(m^2/s) \times 10^{-6}$ |
| $K.V._{40°\ C.} =$ | 1712.90 $(m^2/s) \times 10^{-6}$ |
| V.I. = | 186 |

It is evident that by reducing the reaction temperature product viscosity can be increased.

EXAMPLE V

This example illustrates the use of ethyl aluminum dichloride (EtAlCl$_2$) as the organoaluminum compound. The procedure and ingredients of Example I-C was substantially repeated except that tertiary butyl chloride was replaced by 8.5 grams of P-2000-30.2 polychlorinated polyalphaolefin.

The product oil had the following properties:

| | |
|---|---|
| K.V.$_{100°\ C.}$ = | 61.49 (m$^2$/s) × 10$^{-6}$ |
| K.V.$_{40°\ C.}$ = | 649.5 (m$^2$/s) × 10$^{-6}$ |
| V.I. = | 164 |
| Mn = | 1822 |

It was calculated that the average number of graft chains per substrate molecule was 18.4, and the Mn of the grafted species was 21,918. The grafted molecules accounted for 42.6% of the product. In this instance, 74% of the chlorines on the spine were the site of a graft chain.

EXAMPLE VI

This example explores the consequences of variations in the mode of addition of ingredients to the reaction vessel. Using the ingredients listed in Example III, polymerization was performed by first adding 8.5 grams of P-2000-30.2 polychlorinated substrate to the reaction flask and then adding slowly a solution of Et$_2$AlCl in 200 ml of decene-1. The product is listed as VI-A in the table below.

In a second polymerization, all the Et$_2$AlCl was added to the reaction flask and a solution of the P-2000-30.2 in decene-1 was added slowly. The properties of the product oil are listed under VI-B.

The following table compares the viscometric properties of Examples III, VI-A and VI-B:

| EXAMPLE | III | VI-A | VI-B |
|---|---|---|---|
| Ingredients added over 90 minute period | Both | Et$_2$AlCl only | P-2000-30.2 only |
| K.V.$_{100°\ C.}$ (m$^2$/s) × 10$^{-6}$ | 80.32 | 62.28 | 86.77 |
| K.V.$_{40°\ C.}$ (m$^2$/s) × 10$^{-6}$ | 906.4 | 652.1 | 1007.3 |
| V.I. | 169 | 165 | 169 |
| Mn | 1744 | 1556 | 1777 |

Although all three modes of mixing produce oils of higher molecular weight than Example I-A, it appears that the method of addition employed in VI-A produces slightly lower viscosity than observed in III or VI-B.

EXAMPLE VII

This example illustrates the use of a trialkyl aluminum compound in the preparation of graft polymer. Example V was substantially repeated, except that the ethyl aluminum dichloride was replaced by 24 millimoles of triethyl aluminum. The resulting product had a viscosity of 100° C. of 75.57 (m$^2$/sec) × 10$^{-6}$ and a viscosity index of 174. A control run utilizing triethyl aluminum and tertiary butyl chloride produced an oligomer having a viscosity of only 20.38 (m$^2$/sec)10$^{-6}$ at 100° C.

What is claimed is:

1. A method of making grafted polyalphaolefin polymer comprising
   (A) providing
      (a) an aluminum compound having the formula R$_3$Al$_2$X$_3$ or R$_n$AlX$_{3-n}$, wherein R is C$_1$-C$_{18}$ alkyl, C$_7$-C$_9$ aralkyl, C$_7$-C$_9$ alkaryl or C$_6$-C$_{10}$ aryl; X is Cl, Br or I, and n is an integer from 1 to 3;
      (b) a polyhalogenated compound having the formula (—CH$_2$CR$^1$R$^2$)$_m$Y$_p$, wherein R$^1$ is hydrogen or C$_1$-C$_3$ alkyl; R$^2$ is linear or branched C$_1$-C$_{30}$ alkyl; Y is Cl, Br or I; m is an integer from 3 to 3000; and p is an integer of at least 3;
      (c) a cationically polymerizable monomer having the formula CH$_2$=CR$^1$R$^2$, wherein R$^1$ is hydrogen and R$^2$ is linear C$_1$-C$_{30}$ alkyl; and
   (B) bringing into contact above (a), (b) and (c) under polymerization conditions.
2. The method of claim 1 being carried out at a temperature of from 0° to 60° C.
3. A graft polymer having the formula A[—CH$_2$CR$^1$R$^2$—)$_q$]$_r$, wherein A is (—CH$_2$CR$^1$R$^2$)$_m$Y$_{p-d}$, wherein R$^1$ is hydrogen or C$_1$-C$_3$ alkyl; R$^2$ is linear or branched C$_1$-C$_{30}$ alkyl; q is an integer from 1 to 100; r is an integer from 3 to 1500; m is an integer from 3 to 3000; Y is Cl, Br or I; p is an integer of at least 3; and d has a value from r to p.
4. A method for increasing the viscosity of oil comprising adding to such oil the graft polymer of claim 3.
5. A composition comprising an oil and the graft polymer of claim 3.

* * * * *